US006824707B2

(12) United States Patent
Amakawa et al.

(10) Patent No.: US 6,824,707 B2
(45) Date of Patent: Nov. 30, 2004

(54) ACTIVE MATRIX LIQUID CRYSTAL DEVICE AND SMECTIC LIQUID CRYSTAL MIXTURE

(75) Inventors: Haruki Amakawa, Kakegawa (JP); Toshiaki Nonaka, Kakegawa (JP); Hans-Rolf Dübal, Eltville (DE); Rainer Wingen, Hattersheim (DE)

(73) Assignee: Clariant International Ltd., Muttenz (CH)

( * ) Notice: Subject to any disclaimer, the term of this patent is extended or adjusted under 35 U.S.C. 154(b) by 73 days.

(21) Appl. No.: 10/272,374

(22) Filed: Oct. 16, 2002

(65) Prior Publication Data
US 2003/0127627 A1 Jul. 10, 2003

(30) Foreign Application Priority Data

Oct. 23, 2001 (EP) .............................................. 01125125
Apr. 11, 2002 (EP) .............................................. 02008099

(51) Int. Cl.$^7$ ............................................. C09K 19/52
(52) U.S. Cl. .................................. 252/299.01; 428/1.1
(58) Field of Search ................................ 349/182, 183, 349/184, 185, 186, 187, 188, 167, 168, 171; 428/1.1; 252/299.01

(56) References Cited

U.S. PATENT DOCUMENTS

| | | | |
|---|---|---|---|
| 4,038,280 A | | 7/1977 | Randell et al. |
| 5,002,694 A | * | 3/1991 | Wachtler et al. ........ 252/299.61 |
| 5,071,589 A | | 12/1991 | Dubal et al. |
| 5,122,296 A | | 6/1992 | Johten et al. |
| 5,333,075 A | * | 7/1994 | Harada et al. ............... 349/163 |
| 5,411,676 A | * | 5/1995 | Kelly et al. ............. 252/299.63 |
| 5,445,762 A | | 8/1995 | Manero et al. |
| 5,702,639 A | | 12/1997 | Escher et al. |
| 5,707,545 A | * | 1/1998 | Schlosser et al. ....... 252/299.61 |
| 5,759,443 A | * | 6/1998 | Funfschilling et al. . 252/299.61 |
| 5,851,425 A | * | 12/1998 | Buchecker et al. .... 252/299.61 |
| 5,861,109 A | * | 1/1999 | Goodby et al. ........ 252/299.65 |
| 6,121,448 A | * | 9/2000 | Lewis et al. ................. 544/334 |
| 6,139,925 A | | 10/2000 | Darius et al. |
| 6,225,479 B1 | * | 5/2001 | Buchecker et al. ......... 549/370 |
| 6,406,761 B1 | | 6/2002 | Tarumi et al. |
| 6,660,345 B2 | * | 12/2003 | Coates et al. ................ 428/1.1 |

FOREIGN PATENT DOCUMENTS

| | | |
|---|---|---|
| DE | 196 29 812 | 2/1997 |
| DE | 199 34 799 | 2/2001 |
| EP | 0 385 688 | 9/1990 |
| EP | 0 502 964 | 9/1992 |
| EP | 0 567 854 | 11/1993 |
| EP | 0 599 928 | 6/1994 |
| WO | WO 99/64538 | 12/1999 |
| WO | WO 00/36054 | 6/2000 |
| WO | WO 02/18515 | 3/2002 |

OTHER PUBLICATIONS

English abstract for EP 0502964, Sep. 16, 1992.
English abstract for WO 99/64538, Dec. 16, 1999.
English abstract for WO 00/36054, Jun. 22, 2000.
English abstract for DE 19934799, Feb. 1, 2002.
H. Okumura, et al., "Invited Paper: A 15–in. XGA TFT–AFLCD with Quasi–dc Driving Scheme for Monitor Applications", SID 98 Digest, pp. 1171–1174.
K. Nito, et al., "A novel surface–stabilized monostable ferroelectric LCD", Journal of SID, ½, 1993, pp. 163–169.
H. Furue, et al., "Momostable Polymer–Stabilized SSFLCD with High Contrast Ratio and Grayscale Capability", IDW'98, pp. 209–212.
Taiju Takahashi, et al., "Preliminary Study of Field Sequential Fullcolor Liquid Display using Polymer Stabilized Ferroelectric Liquid Crystal Display", J. Appl. Phys., vol. 38, (1999), pp. L534–L536.
Toshiake Nonaka, et al., "Material characteristics of an active matrix LCD based upon chiral smectics", Liquid Crystals, 1999, vol. 26, No. 11, pp. 1599–1602.
H. Pauwels, et al., "Analysis of the Asymmetric Continuous Director Rotation Mode of Ferroelectric Liquid Crystal Displays", Proceedings of the IDRC, Florida, Sep. 25–28 2000, pp. 72–75.
V.F. Petrov, "Liquid crystals for AMLCD and TFT–PDLCD applications", Liquid Crystals, 1995, vol. 19, No. 6, pp. 729–741.
Vladimir F. Petrov, "Liquid crystals for advanced display applications", SPIE, vol. 2408, 1995, pp. 84–99.
Roman Dabrowski, "Liquid crystalline materials for active matrix displays", Builetyn WAT, 48(4), 1999, pp. 5–34.
Peer Kirsch, et al., Nematic liquid crystals for active matrix displays: Molecular design and synthesis, Angew. Chem. Int. Ed., 2000, 39, pp. 4216–4235.
English abstract for JP 2001–100189, Apr. 31, 2001.

* cited by examiner

*Primary Examiner*—Shean C. Wu
*Assistant Examiner*—Jennifer R. Sadula
(74) *Attorney, Agent, or Firm*—Alan P. Kass

(57) ABSTRACT

A smectic liquid crystal mixture comprising a smectic liquid crystal base mixture and at least one dopant, which is either a complex ligand or an organic material, in a concentration of 0.01 to 5.0 weight percent.

15 Claims, No Drawings

ACTIVE MATRIX LIQUID CRYSTAL DEVICE AND SMECTIC LIQUID CRYSTAL MIXTURE

The present invention relates to a novel smectic liquid crystal mixture and a novel active matrix liquid crystal device or display. More particularly, it relates to chiral smectic or more specifically ferroelectric liquid crystal mixtures, which enables the generation of gray levels and full color representation useful for computer monitors, TV, DVD, Video and other displays. In particular these displays are useful for high speed applications and for yielding a strong colour saturation by improved backlight techniques which rely upon a high speed liquid crystal. A further aspect of this invention are active matrix displays containing such a mixture, particularly in a monostable geometry.

Monostable chiral smectic liquid crystals have been proposed to be combined with active matrix technology to simultaneously allow the utilization of a very high 'pixel speed' and show a gray scale, contrary to bistable SSFLC displays.

Takatoh et. al. ($6^{th}$ International Conference on Ferroelectric Liquid Crystals, Jul. 20–24, 1997, Brest, France; M. Takatoh et al. 1998, SID Digest, 1171–1174) have demonstrated an AM display based upon chiral smectics using a very high $P_s$ material driven with an active matrix with polycrystalline Silicon-TFT. Nito et. al. (Nito et al., 1993, Journal of the SID, 1/2,163–169.) have suggested a monostable AM-FLC with much lower $P_s$, however, with the disadvantage of a stripey FLC texture which is not suitable for high contrast displays without further improvements. Furue et. al. (Furue, H. et al., 1998, IDW '98, 209–212) suggested a polymer stabilized SSFLCD with a FELIX® mixture with a material having a moderate $P_s$ value.

Asao et. al. have presented a monostable FLC mode (Y. Asao et al., ILCC 2000, Sendai, and Jpn. J. Appl. Phys. 38, L534–L536, 1999 therein called "half-V-shape FLC" mode; see also T. Nonaka et. al., Liquid Crystals 26(11), 1599–1602, 1999, therein called "CDR" mode). Such displays provide, by virtue of their smaller Ps values, solutions for the gray scale problem and the resolution limitation caused by too large $P_s$ values in active matrix panels.

A remaining problem in the application of TFT-FLCD (e.g. monostable FLC) is the limited so-called "image sticking" effect (H. Pauwels et. al., Proceedings of the IDRC, Florida 2000, pp.72–75), caused by the activity of the manifold of charge carriers that are present in the pixel volume and which tend to generate a hysteresis effect, i.e. the type of gray level becomes dependent on the pixel switching history and the correct addressing of gray levels becomes therefore hardly reproducible in practice.

Thus it is seemingly an important factor to maintain a very low ion content and to achieve chemical stability against heat and light, both of which could cause additional ion formation. This demand has in practice lead to the exclusion of any material containing hetero atoms such as N, S, even O in liquid crystal mixtures for active matrix (i.e. TFT or MIM) applications {cp. e.g. Petrov et al., Liq. Cryst. 19(6), 729 (1995) [CAN 124:101494]; Petrov, Proc. SPIE-Int. Soc. Opt. Eng.(1995), 2408 [CAN 123:241500]; Dabrowski, Biul. Wojsk. Akad. Techn. 48(4), 5 (1999) [CAN 131:163227]; Kirsch, Angew. Chem., Int. Ed. 39(23), 4216 (2000) and references cited in these papers}. Whereas, so far, this could successfully be done for nematics (cp. e.g. DE-A 1 962 9812, p. 12 to 16), there is hardly any smectic ($S_c$) material without such hetero atoms. Thus the use of fast switching smectics for TFT application is strongly limited if not prohibited if the condition to exclude heteroatoms would be mandatory.

The objective of the present invention was therefore to provide a smectic liquid crystal mixture and an active matrix liquid crystal display with very high reproducibility of the gray levels irrespective of the containment of hetero atoms, in particular ferroelectric or antiferroelectric liquid crystal mixtures.

Contrary to the above-mentioned approach to keep liquid crystal materials free of ionic decontaminations, we have surprisingly found that certain dopants as additives to smectic liquid crystal mixtures are indeed effective in removing the image sticking in active matrix displays, while keeping a sufficiently high holding ratio. This is insofar unexpected, as the dopants, e.g. polyethylene glycoles, crown ethers, aza-crown ethers and the like usually contain several oxygen and/or nitrogen atoms and increase the conductivity of the material. Thus, in the traditional view, these dopants should cause a strong image sticking and a low holding ratio. Surprisingly, the opposite is observed.

Thus, the present invention provides a smectic liquid crystal mixture comprising a smectic liquid crystal base mixture and at least one dopant, which is either a complex ligand or an organic material in a concentration of 0.01 to 5.0 weight percent. The electrical conductivity of the instant liquid crystal mixtures is increased by at least 20 percent with respect to the base mixture In a preferred embodiment of the instant invention the dopant is present in a concentration of 0.05 to 1.0 weight percent, which leads to a suppression or minimization of the image sticking effect up to 10% of the untreated value. The liquid crystal mixture according to the invention can be used in active liquid crystal displays.

In particular the present invention relates to a ferroelectric or antiferroelectric liquid crystal mixture, most particularly a monostable ferroelectric liquid crystal mixture, especially a monostable ferroelectric liquid crystal mixture having a phase sequence with decreasing temperature isotropic-tilted smectic
or
isotropic-nematic or cholesteric-tilted smectic
or
isotropic-nematic or cholesteric-smectic A-tilted smectic, comprising one or several dopants.

For dopants according to invention with —OH or —NH$_2$— or —NH— or —SH groups, for instance those described in EP-B-385 688, U.S. Pat. No. 5,122,296 and U.S. Pat. No. 6,139,925, which are hereby incorporated by reference.

The complex ligands according to the invention are either podands, coronands or cryptands. Pertinent terminology and listing of pertinent compounds is hereby incorporated by reference to EP-B-385 688, EP-B-502 964 and EP-B-599 928.

The complex ligands can also be α-cyclodextrin [10016-20-3], β-cyclodextrin [7585-39-9] or γ-cyclodextrin [17465-86-0].

A preferred group of podands encompasses oligoethylendialkylether and polyethylenglycols, respectively, each preferably with a molar mass above 350 amu, both sub-groups optionally substituted by pendant groups.

A preferred group of coronands encompasses crown ethers (i.e. medio- and macro-cycles with oxygen donors), aza crown (i.e. medio- and macro-cycles with nitrogen and oxygen donors), each sub-group optionally substituted by pendant groups.

Especially preferred are coronands with one or two nitrogen donors, these nitrogen atoms being substituted by —C(=O)—R groups wherein R is an alkyl group (linear or branched) or a cyclic moiety; with this respect reference is made to EP-B-599 928 which is hereby incorporated by reference.

A prefered group of cryptands encompasses bicyclic species with nitrogen and oxygen donors (e.g. kryptofix®), bicyclic species exclusively with oxygen donors, and tricyclic species (e.g. soccerball cryptand) with either nitrogen and oxygen donors or exclusively oxygen donors; all subgroups can be substituted by pendant groups.

In either group of preferred complex ligands their properties can be adjusted to the additional parameters of the display by modifying the pattern of the podand, coronand and cryptand, resp., through incorporation of hetero atoms (other than nitrogen and oxygen, e.g. sulfur or silicium) as donors, through incorporation of cyclic donor moieties (e.g. pyridine or quinoline end groups in case of podands; e.g. phenylen-diyl in case of benzo crowns) and through attaching pendant groups, respectively. Combinations of these different types of modifications are also possible.

In particular the sum of the concentrations (in weight percent=wt %) of the dopant is below 10 wt %, preferably below 5 wt %, especially below 3 wt %. Preferably, the average molar mass of the dopants (or in case of one dopant the molar mass) is between 100 and 2000 amu, especially between 200 and 1000 amu, in particular between 200 and 600 amu.

For aza coronands, e.g. as disclosed in EP-B 599928, a preferred range is between 300 and 700 amu.

A further object of the invention is to provide a smectic liquid crystal display device, operated in an active matrix panel comprising the above described mixtures.

A further object of the invention is to provide a ferroelectric liquid crystal display device operated in an active matrix panel using the above described mixtures. With preference this display is a monostable ferroelectric display, such as half-V-shape, CDR or short pitch FLC displays.

A further object of the invention is to provide an antiferroelectric liquid crystal display device operated in an active matrix panel using the above described mixtures. With preference this display is a monostable antiferroelectric display, such as the so-called "V-shape" mode.

A further object of the invention is the use of the above described smectic mixtures operated in an active matrix panel, especially if the liquid crystal is a chiral smectic, particularly a monostable chiral smectic mode.

The liquid crystal mixtures according to the invention are prepared in a manner which is customary per se. As a rule the components are dissolved in one another, advantageously at elevated temperatures.

The liquid crystal mixtures according to the invention generally comprises at least two (2), preferably at least five (5), particularly at least eight (8) compounds.

As an alternative to add the dopants into the liquid crystal mixture, they can be mixed into or added onto the alignment layer, so that the dopants are effectively in contact with the smectic liquid crystal.

Optional additional constituents of the mixtures according to invention are materials that increase the light stability [UV stabilizers, e.g. of the "benzophenone" type, "benzotriazole" type or HALS (hindered amine light stabilizer) type]. Preferably the mixtures may contain 0.01 wt.-% to 10 wt.-% of one or several UV stabilizers; especially preferred are mixtures containing 0.1 wt.-% to 5 wt.-% of one or several UV stabilizers.

Of the HALS type several species have been disclosed for a variety of applications, e.g. in U.S. Pat. No. 4,038,280 or Sedlar, Polym. Photochem. (1982), 2(3), 175 [CAN 97: 24546].

There are several kinds of commercially available HALS compounds (e.g. provided by Clariant and Ciba Specialty Chemicals), mainly used for modifying UV stability for plastics and paints. These compounds are not specially designed for smectic liquid cystal materials, so that their use may induce decrease of phase transition temperatures of the liquid crystal or cause miscibility problems, all depending on the structures of the liquid crystal compounds and HALS compounds, resp.

More specifically, HALS compounds for use in liquid crystal mixtures have been disclosed in WO 02/18515 which is hereby incorporated by reference.

A preferred group of HALS compounds encompasses the formulae (Ia) to (Id) and (II)

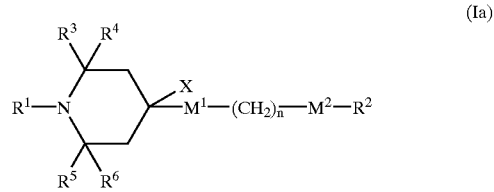
(Ia)

wherein n is an integer from 1 to 20
X is H
$R^1$ is H or alkyl of 1 to 4 C atoms
$R^3, R^4, R^5, R^6$ are $CH_3$

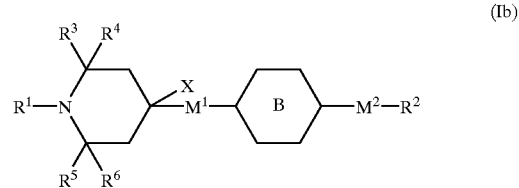
(Ib)

wherein

X is H
$R^1$ is H or alkyl of 1 to 4 C atoms
$R^3, R^4, R^5, R^6$ are $CH_3$

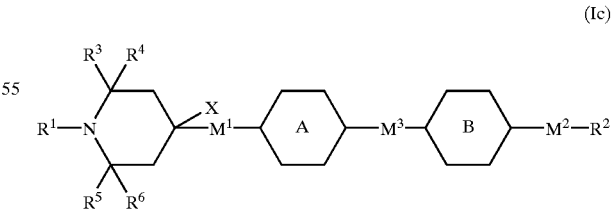
(Ic)

wherein

X is H
$R^1$ is H or alkyl of 1 to 4 C atoms $R^3$, $R^4$, $R^5$, $R^6$ are $CH_3$ (Id)

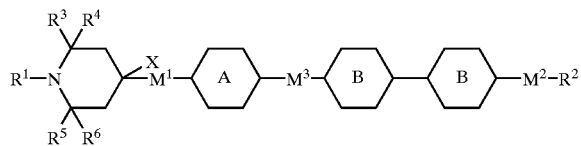

wherein

X is H
$R^1$ is H or alkyl of 1 to 4 C atoms
$R^3$, $R^4$, $R^5$, $R^6$ are $CH_3$ In either case $R^2$ is H, F, a linear or branched alkyl group of 1 to 20 C atoms or linear or branched alkenyl group of 2 to 20 C atoms, wherein in either case one or two —$CH_2$— groups can be replaced by —O—, —C(=O)O—, —Si($CH_3$)$_2$—, it also being possible to replace one or more H of the alkyl or alkenyl group by F or $CH_3$ or a radical

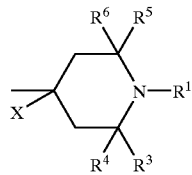

$R^3$, $R^4$, $R^5$, $R^6$: represent independently from another an alkyl group of 1 to 8 C atoms
$M^1$, $M^2$ are independently from another for a single bond, —OC(=O), —C(=O)O—,
—OCH$_2$—, or —NH—
$M^3$ is a single bond, —OC(=O)—, —C(=O)O—, —OCH$_2$—, —CH$_2$O—, —C≡C—, —CH$_2$CH$_2$—, —CH$_2$CH$_2$CH$_2$CH$_2$

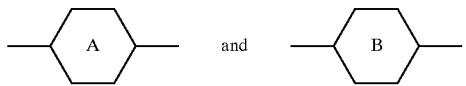

are independently from another phenylen-1,4-diyl, which optionally can be substitued by one, two or three F, or cyclohexan-1,4-diyl, which can optionally be substituted by one CN, $CH_3$ or F, or pyrimidin-2,5-diyl, optionally substituted by one F, pyridine-2,5-diyl, which can optionally be substituted by one F, or naphthalene-2,6-diyl, which can optionally be substituted by one, two or three F, or 1,2,3,4-tetrahydronaphthalene-2,6-diyl (the aromatic ring optionally substituted by one, two or three F), or decahydronaphthalene-2,6-diyl, or indane-2,5(6)-diyl, or fluorene-2,7-diyl, or phenanthrene-2,7-diyl, or 9,10-dihydrophenanthrene-2,7-diyl, or (1,3,4)thiadiazol-2,5-diyl, or (1,3)thiazol-2,5-diyl, or (1,3)thiazol-2,4-diyl, or thiophen-2,4-diyl, or thiophen-2,5-diyl, or (1,3)dioxan-2,5-diyl, or piperidin-1,4-diyl, or piperazin-1,4-diyl (II)

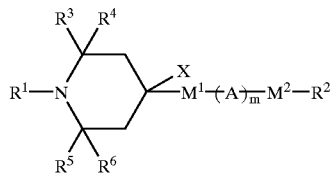

wherein $R^1$ is H or a linear or branched alkyl group of 1 to 20 C atoms or linear or branched alkenyl group of 2 to 20 C atoms, wherein in either case one —$CH_2$— group can be replaced by cyclohexylen-1,4-diyl, or one or two —$CH_2$— groups can be replaced by —O—, if nonadjacent to N, or by —C(=O)— or —Si($CH_3$)$_2$—, and one or more H of the alkyl or alkenyl group optionally being replaced by F or $CH_3$.

$R^2$ is
a) H or F
b) a linear or branched alkyl group of 1 to 20 C atoms or linear or branched alkenyl group of 2 to 20 C atoms, wherein in either case one or two —$CH_2$— groups can be replaced by —O—, —C(=O)O—, —Si($CH_3$)$_2$—, it also being possible to replace one or more H of the alkyl or alkenyl group by F or $CH_3$.
c) a radical

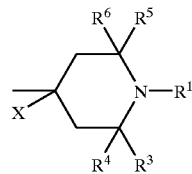

wherein independently from the respective meanings in (I)
$R^3$, $R^4$, $R^5$, $R^6$: represent independently from another an alkyl group of 1 to 8 C atoms
$M^1$, $M^2$ are independently from another for a single bond, —OC(=O), —C(=O)O—,
—OCH$_2$—, or —NH—
A is the group —C(=Y)— wherein Y is CH-Z with Z being phenylen-1,4-diyl, optionally substituted by 1 to 3 halogen atoms, alkyl or alkyloxy groups of 1 to 4 C atoms, with the proviso that $M^1$ and $M^2$ are —C(=O)O— and —OC(=O)—, respectively;
X is H, OH, or a linear or branched alkyl or alkyloxy group of 1 to 20 C atoms, wherein one or two —$CH_2$— groups can be replaced by —O—, —C(=O)O—, —Si($CH_3$)$_2$—, it also being possible to replace one or more H by F or $CH_3$
m: is 0 or 1

By matching of LC composition, type of complex ligand and type of light stabilizer mixtures can be achieved that withstand light-induced stress while the mixture and display performance (e.g. minimal hysteresis in monostable FLCDs, high contrast, stable high-quality alignment, high voltage-holding-ratio, addressability) remain in a technically required range.

With this respect favorable combinations can be derived from

LC mixtures e.g. as disclosed in WO99/64538, WO00/36054 or DE 19934799
and
coronands as disclosed in EP 385688, EP 502964 and EP 599928
and
2,2,6,6-tetramethyl-piperidine-4-yl compounds as disclosed in WO 02/18515

Preferred compositions comprise

LC mixtures e.g. as disclosed in WO99/64538, WO00/36054 or DE 1993479
and
aza coronands as disclosed in EP 599928
and
2,2,6,6-tetramethyl-piperidine-4-yl compounds as disclosed in WO 02/18515

Optional additional constituents of the mixtures according to invention are materials that increase the stability against oxidative degradation (antioxidants, e.g. of the "sterically hindered phenol" type). Preferably the mixtures may contain 0.01 wt.-% to 10 wt.-% of one or several antioxidants; especially preferred are mixtures containing 0.1 wt.-% to 5 wt.-% of one or several antioxidants.

Optionally the mixtures according to invention may contain a combination of UV stabilizers and antioxidants.

Chiral smectic liquid crystal mixtures according to the invention are particularly suitable for use in electro-optical switching and display devices (displays). These displays are usually constructed in such a way that a liquid crystal layer is enclosed on both sides by layers which are usually, in this sequence starting from the LC layer, at least one alignment layer, electrodes and a limiting sheet (for example of glass). In addition, they can contain spacers, adhesive frames, polarizers and, for color displays, thin color-filter layers or are operated in the sequential backlight technique. Other possible components are antireflection, passivation, compensation and barrier layers and, for active-matrix displays, electric non-linear elements, such as thin-film transistors (TFTs) and metal-insulator-metal (MIM) elements. The structure of liquid crystal displays has already been described in detail in relevant monographs (see, for example, T. Tsukuda, "TFT/LCD Liquid crystal displays addressed by thin film transistors", Japanese Technology Reviews, 1996 Gordon and Breach, ISBN 2-919875-01-91.

An active matrix liquid crystal display within the scope of this invention can also be an optical element that acts as a light valve or a device used to change the polarization state of light by means of a field-induced re-orientation of the smectic liquid crystal molecules, in particular an FLCOS (ferroelectric liquid crystal on silicon), an optical shutter and the like.

In a preferred embodiment the FLC display is operated in the monostable mode with active matrix panel.

Several documents are cited in this application, e.g. to discuss the state of the art, synthesis of compounds used in the present invention or application of the mixtures according to the invention. All these documents are hereby incorporated by reference.

EXAMPLE 1

Cell Construction and Hysteresis Measurement

A solution of LQT 120 (Hitachi Kasei) is applied onto glass substrates with ITO by spin coating at 2500 rpm. The electrode area was 0.9 cm². The substrates are heated at 200° C. for 1 hour to form a film. After rubbing the coated film with a nylon cloth in one direction, the substrates are assembled into a cell with spacers having a thickness of 1.5 $\mu$m inserted between the substrates in such a manner that the rubbing directions are anti-parallel to each other.

A chiral smectic liquid crystal mixture (called M1 hereafter) with the phase sequence:

I 100 N* 61 SmC* is filled into the cell in the isotropic phase, cooling progressively through the nematic- (or cholesteric-) and the smectic C*-phase. A small bias dc voltage of 3 V is applied during the nematic-smectic C* phase transition to yield a uniform monostable texture.

The cell is now installed in a polarising microscope, equipped with a photodiode to measure the optical transmission between crossed polarisers. The cell is aligned such, that with no voltage applied it appears dark due to the optical axis being arranged parallel to one of the polarisers. By applying 5 Volts the cell is switched into a bright state having a maximum in transmittance.

The cell is then addressed by voltage pulses to test the reproducibility of addressing gray levels. The following behaviour is observed:

| Voltage | Transmittance | Voltage history |
|---|---|---|
| 2.3 V | 32.8% | increasing from 0 V–2.3 V (dark to grey) |
| 2.3 V | 40.8% | decreasing from 5 V–2.3 V (bright to grey) |

Ideally in both cases, the grey level transmittances should reach the same level. The result however show an unwanted very pronounced memory of the previous state, i.e. the switching from dark to grey leads to a different grey level compared to bright to grey (image sticking). This hysteresis effect is time-dependent. The relaxation time to a constant value should be as short as possible, the remaining hysteresis after relaxation should be as small as possible. These parameters are subject to improvement.

We define the hysteresis effect by the difference DT:

DT=Transmittance (bright to grey)–Transmittance (dark to grey) or, in this case:

DT=Transmittance (5 V to 2.3 V)–Transmittance (0 V to 2.3 V)

DT(t) is time dependent. The results of the time-dependent observation (remaining hysteresis DT($\infty$)) and relaxation time $\tau(R)$) are compiled in table 1.

EXAMPLE 2

Effect of Adding a Dopant

In the same manner, another cell is prepared and filled with a modified mixture (called M2 hereafter) being composed of 99.8 w % M1 and 0.2 w % D1, with the dopant D1 being the compound 1,4,10,13-Tetraoxa-7,16-diaza-7,16-dipentanoyl-cyclooctadecane [190844-17-8].

The cell is then addressed with the same 2.3V voltage pulses as in example 1 to determine the time-dependent hysteresis effect.

The results of DT(t) are also included in table 1.

TABLE 1

Comparison of the hysteresis effect of M1 and M2

| Time (in sec) | DT in % for mixture M1 | DT in % for mixture M2 |
|---|---|---|
| 0 | 8.0 | 10.8 |
| 15 | 4.0 | 6.0 |
| 30 | 2.6 | 2.0 |
| 60 | 2.0 | 1.1 |
| 120 | 1.4 | 0.4 |
| 180 | 1.2 | 0.3 |
| 360 | 1.0 | 0.3 |

Mixture M1: DT($\infty$)=1.0% $\tau$(R)=120 sec
Mixture M2: DT($\infty$)=0.3% $\tau$(R)=120 sec As can be seen mixture M2 exhibits improved hysteresis DT($\infty$) compared to mixture M1.

EXAMPLE 3

To check the effect of dopants in the combination with stabilisers, a third mixture (called M3 hereafter) is prepared being composed of 99.8 w % M1 and 0.2 w % of stabilizer #3369 [2,2,6,6-Tetramethyl-piperidine-4-yl) (4-hexyl) benzoate] (Clariant GmbH). A further mixture (called M4 is prepared being composed of 99.6 w % M1 and 0.2 w % D1 and 0.2 w % #3369.

The time-dependent hysteresis of both mixtures are tested in the same manner (2.3V pulse addressing) as in examples 1 and 2.

Table 2 shows the time-dependent hysteresis effect.

TABLE 2

Comparison of the hysteresis effect of M3 and M4

| Time (in seconds) | DT in % for Mixture M3 | DT in % for Mixture M4 |
|---|---|---|
| 0 | 14.4 | 14.8 |
| 15 | 10.0 | 6.0 |
| 30 | 6.8 | 3.2 |
| 60 | 5.3 | 2.4 |
| 120 | 5.0 | 2.2 |

Mixture M3: DT($\infty$)=5.0% $\tau$(R)=60 sec
Mixture M4: DT($\infty$)=2.2% $\tau$(R)=60 sec As can be seen, mixture M4 exhibits improved hysteresis DT($\infty$) compared to mixture M3.

Mixture M2: $\tau$(R)=120 sec
Mixture M4: $\tau$(R)=60 sec

As can be seen, mixture M4 exhibits improved relaxation time compared to mixture M2.

EXAMPLE 4

Conductivity Measurements

The conductivities of the mixtures M1–M4 are measured by means of a MTR-1 device (Toya Technica). The current-voltage curves are typically unsymmetric, therefore two values are given:

switch ON state=from low to high voltages
switch OFF state=from high to low voltages

TABLE 3 summarises the results:

| Mixture | Conductivity in the switch ON state (1/TeraOhm*cm) | Change (%) | Conductivity in the switch OFF state (1/TeraOhm*cm) | Change (%) |
|---|---|---|---|---|
| M1 | 0.014 | 0 | 0.0033 | 0 |
| M2 | 0.037 | +164 | 0.023 | +596 |
| M3 | 0.016 | +14 | 0.0053 | +60 |
| M4 | 0.333 | +2278 | 0.333 | +9900 |

(10 Vpp, triangular wave, 0.1 Hz)

Mixtures M2 and M4 have much higher conductivity than M1 and M3.

Mixtures M2 and M4 show improved hysteresis effect (tables 1 and 2) compared to M1 and M3.

This is unexpected, because in the traditional view ionic impurities in LC material, contaminants from alignment layer material and/or glue which increase the conductivity should cause a strong image sticking.

EXAMPLE 5

Cell Construction with Another Alignment Layer Material and Hysteresis Measurement A solution of SE-7992 (Nissan Chemical Industries) is applied instead of LQT-120 in example 1.

M1 is filled into the cell in the isotropic phase and treated to yield a uniform monostable texture in the same manner as in example 1.

The experiment on the hysteresis effect is also the same as in example 1; the results of DT(t) are included in table 4.

EXAMPLE 6

M2 is tested in the same manner as in example 5. The results of DT(t) are also included in table 4.

TABLE 4

Comparison of the hysteresis effect of M1 and M2 in SE7992 cell

| Time (in seconds) | DT in % for Mixture M1 | DT in % for Mixture M2 |
|---|---|---|
| 0 | 6.0 | 4.2 |
| 10 | 3.0 | 2.0 |
| 20 | 1.7 | 1.0 |
| 30 | 1.3 | 0.8 |
| 60 | 1.4 | 0.6 |

Mixture M1: DT($\infty$)=1.4% $\tau$(R)=20 sec
Mixture M2: DT($\infty$)=0.6% $\tau$(R)=20 sec As can be seen mixture M2 exhibits improved hysteresis DT($\infty$) compared to mixture M1.

EXAMPLE 7

M3 is tested in the same manner as in example 5. The results of DT(t) are included in table 5.

EXAMPLE 8

M4 is tested in the same manner as in example 5. The results of DT(t) are also included in table 5.

TABLE 5

Comparison of the hysteresis effect of M3 and M4 in SE7992 cell

| Time (in seconds) | DT in % for Mixture M3 | DT in % for Mixture M4 |
|---|---|---|
| 0 | 11.4 | 4.8 |
| 10 | 8.7 | 1.2 |
| 20 | 8.4 | 1.1 |
| 30 | 8.6 | 0.9 |
| 60 | 8.1 | 1.0 |

Mixture M3: $DT(\infty)=8.1\%$ $\tau(R)=10$ sec
Mixture M4: $DT(\infty)=1.0\%$ $\tau(R)=10$ sec As can be seen, mixture M4 exhibits improved hysteresis $DT(\infty)$ mixture M3.

Mixture M2: $\tau(R)=20$ sec
Mixture M4: $\tau(R)=10$ sec

As can be seen, mixture M4 exhibits improved relaxation time compared to mixture M2.

EXAMPLE 9

Conductivity Measurements

The conductivities of the mixtures M1–M4 in SE7992 cell are measured by means of a MTR-1 device (Toya Technica) in the same manner in example 4.

TABLE 6 summarises the results in SE7992 cell:

| Mixture | Conductivity in the switch ON state (1/TeraOhm*cm) | Change (%) | Conductivity in the switch OFF state (1/TeraOhm*cm) | Change (%) |
|---|---|---|---|---|
| M1 | 0.020 | 0 | 0.0058 | >0.01 |
| M2 | 0.061 | +205 | 0.056 | +865 |
| M3 | 0.071 | +250 | 0.063 | +986 |
| M4 | 0.80 | +3900 | 0.78 | +8176 |

(10 Vpp, triangular wave, 0.1 Hz)

Mixtures M2 and M4 have higher conductivity than M1 and M3.
Mixtures M2 and M4 show improved hysteresis effect (tables 4 and 5) compared to M1 and M3.

EXAMPLE 10

D2 {7,16-bis(tricyclo[3.3.1.1³,⁷]dec-1-ylcarbonyl)-1,4,10,13-tetraoxa-7,16-diazacyclooctadecane [148515-35-9]} is mixed into the mixture M3 instead of D1 in the same manner as in example 8. The result of DT(t) is included in table 7.

EXAMPLE 11

D3 {16-(tricyclo[3.3.1.1³,⁷]dec-1-ylcarbonyl)-1,4,7,10,13-pentaoxa-16-azacyclooctadecane} is mixed into the M3 instead of D1 in the same manner as in example 8. The result of DT(t) is included in table 7.

TABLE 7

Hysteresis and relaxation (Dt in %) in SE7992 cell

| Time (in seconds) | DT in % for Mixture M3 | DT in % for Example 10 | DT in % for Example 11 |
|---|---|---|---|
| 0 | 11.4 | 6.7 | 8.4 |
| 10 | 8.7 | 2.6 | 3.3 |
| 20 | 8.4 | 2.4 | 3.2 |
| 30 | 8.6 | 2.1 | 3.5 |
| 60 | 8.1 | 2.3 | 3.0 |

Mixture M3: $DT(\infty)=8.1\%$ $\tau(R)=10$ sec
Example 10: $DT(\infty)=2.3\%$ $\tau(R)=10$ sec
Example 11: $DT(\infty)=3.0\%$ $\tau(R)=10$ sec As can be seen, example 10 and example 11 exhibit improved hysteresis $DT(\infty)$ compared to mixture M3.

What is claimed is:

1. A smectic liquid crystal mixture comprising a smectic liquid crystal base mixture, at least one dopant, which is either a complex ligand or an organic material, in a concentration of 0.01 to 5.0 weight percent, and a light stabilizer which is a HALS compound comprising a 2,2,6,6-tetramethyl-piperidine-4-yl moiety.

2. A smectic liquid crystal mixture according to claim 1, wherein the dopant has at least one —OH or —NH$_2$ or —NH— or —SH group.

3. A smectic liquid crystal mixture according to claim 1 having the phase sequence isotropic-nematic or cholesteric-tilted smectic.

4. A smectic liquid crystal mixture according to claim 1, wherein the complex ligands are podants, coronands or cryptands.

5. A smectic liquid crystal mixture according to claim 1, wherein the sum of the concentration of the dopants is below 10 weight percent.

6. A smectic liquid crystal mixture according to claim 1, wherein the average molar mass of the dopants is between 100 and 2000 amu.

7. A smectic liquid crystal mixture according claim 1 wherein the mixture comprises at least one compound of formulae (Ia), (Ib), (Ic), (Id) or (II) and at least one complex ligand of the coronand or cryptand type

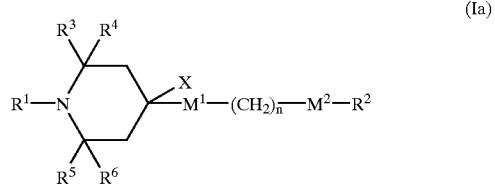

(Ia)

wherein n is an integer from 1 to 20

X is H

R$^1$ is H or alkyl of 1 to 4 C atoms $R^3$, $R^4$, $R^5$, $R^6$ are $CH_3$

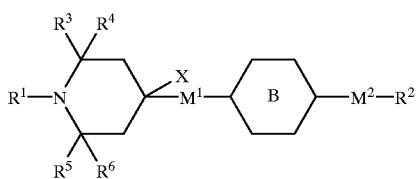
(Ib)

wherein
X is H
$R^1$ is H or alkyl of 1 to 4 C atoms
$R^3$, $R^4$, $R^5$, $R^6$ are $CH_3$

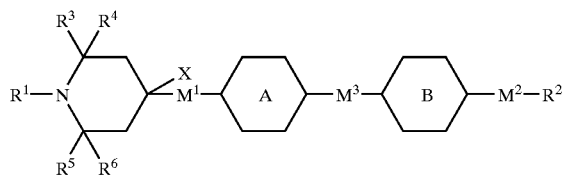
(Ic)

wherein
X is H
$R^1$ is H or alkyl of 1 to 4 C atoms
$R^3$, $R^4$, $R^5$, $R^6$ are $CH_3$

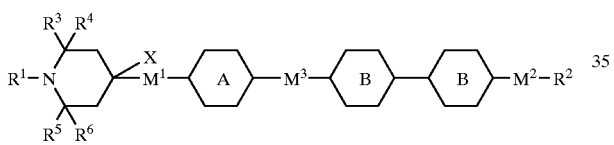
(Id)

wherein
X is H
$R^1$ is H or alkyl of 1 to 4 C atoms
$R^3$, $R^4$, $R^5$, $R^6$ are $CH_3$
in either case
$R^2$ is H, F, a linear or branched alkyl group of 1 to 20 C atoms or linear or branched alkenyl group of 2 to 20 C atoms, wherein in either case one or two —$CH_2$— groups can be replaced by —O—, —C(=O)O—, —Si($CH_3$)$_2$—, it also being possible to replace one or more H of the alkyl or alkenyl group by F or $CH_3$ or a radical

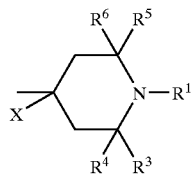

$R^3$, $R^4$, $R^5$, $R^6$: represent independently from another an alkyl group of 1 to 8 C-atoms
$M^1$, $M^2$ are independently from another for a single bond, —OC(=O)—, —C(=O)O—, —$OCH_2$—, or —NH—
$M^3$ is a single bond, —OC(=O)—, —C(=O)O—, —$OCH_2$—, —$CH_2O$—, —C≡C—, —$CH_2CH_2$—,

—$CH_2CH_2CH_2CH_2$—

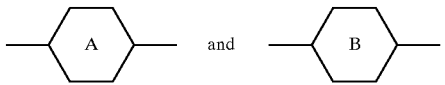

are independently from another phenylen-1,4-diyl, which optionally can be substituted by one, two or three F, or cyclohexan-1,4-diyl, which can optionally be substituted by one CN, $CH_3$ or F, or for pyrimidin-2,5-diyl, optionally substituted by one F, pyridine-2,5-diyl, which can optionally be substituted by one F, or naphthalene-2,6-diyl, which can optionally be substituted by one, two or three F, or 1,2,3,4-tetrahydronaphthalene-2,6-diyl (the aromatic ring optionally substituted by one, two or three F), or decahydronaphthalene-2,6-diyl, or indane-2,5(6)-diyl, or fluorene-2,-7-diyl, or phenanthrene-2,7-diyl, or 9,10-dihydrophenanthrene-2,7-diyl, or (1,3,4) thiadiazol-2,5-diyl, or (1,3)thiazol-2,5-diyl, or (1,3) thiazol-2,4-diyl, or thiophen-2,4-diyl, or thiophen-2,5-diyl, or (1,3)dioxan-2,5-diyl, or piperidin-1,4-diyl, or piperazin-1,4-diyl

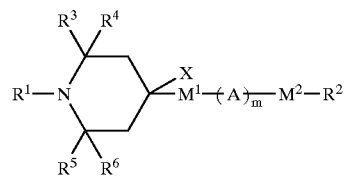

wherein
$R^1$ is H or a linear or branched alkyl group of 1 to 20 C atoms or linear or branched alkenyl group of 2 to 20 C atoms, wherein in either case one —$CH_2$— group can be replaced by cyclohexylen-1,4-diyl, or one or two —$CH_2$— groups can be replaced by —O—, if non-adjacent to N, or by —C(=O)— or —Si($CH_3$)$_2$—, and one or more H of the alkyl or alkenyl group optionally being replaced by F or $CH_3$,
$R^2$ is
a) H or F
b) a linear or branched alkyl group of 1 to 20 C atoms or linear or branched alkenyl group of 2 to 20 C atoms, wherein in either case one or two —$CH_2$— groups can be replaced by —O—, —C(=O)O—, —Si($CH_3$)$_2$—, it also being possible to replace one or more H of the alkyl or alkenyl group by F or $CH_3$,
c) a radical

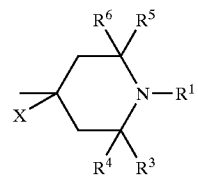

wherein independently from the respective meanings in (I) $R^3$, $R^4$, $R^5$: represent independently from another an alkyl group of 1 to 8 C-atoms $M^1$, $M^2$ are independently from another for a single bond, —OC(=O)—, —C(=O)O—, —$OCH_2$—, or —NH—
A is the group —C(=Y)— wherein Y is CH—Z with Z being phenylen-1,4 diyl, optionally substituted by 1 to 3 halogen atoms alkyl or alkyloxy groups of 1 to 4 C atoms, with the proviso that $M^1$ and $M^2$ are —C(=O)O— and —OC(=O)—, respectively;

X is H, OH, or a linear or branched alkyl or alkyloxy group of 1 to 20 C atoms, wherein one or two —$CH_2$— groups can be replaced by —O—, —C(=O)O—, —Si($CH_3$)$_2$—, it also being possible to replace one or more H by F or $CH_3$ m: is 0 or 1.

8. A smectic liquid crystal mixture according to claim 1, wherein the mixture comprises a smectic liquid crystal base mixture and at least one dopant, wherein the electrical conductivity is increased by at least 20 percent with respect to the base mixture.

9. A smectic liquid crystal mixture according to claim 1, wherein the concentration of the dopant is from 0.05 to 1.0 weight percent, which suppresses or minimizes the image sticking effect up to 10% of the untreated value.

10. Monostable active matrix display comprising a tilted smectic liquid crystal mixture according to claim 1 exhibiting a conductivity larger than $10^{-14}$ (Ohm·cm)$^{-1}$, measured under the conditions triangle waveform and 0.1 Hz frequency and 10 V voltage (peak to peak).

11. Active matrix liquid crystal device, comprising a smectic liquid crystal mixture according to claim 1.

12. Active matrix liquid crystal display according to claim 11, wherein the dopants are mixed into or added onto the alignment layer.

13. Active matrix liquid crystal device according to claim 11, comprising the smectic liquid crystal mixture in monostable orientation.

14. Active matrix liquid crystal device according to claim 11, wherein the projection of the smectic layer normal onto the electrode surface is not parallel to the rubbing direction.

15. Active matrix liquid crystal device according to claim 11, wherein the liquid crystal layer is enclosed on both sides by at least one alignment layer, electrodes and a limiting sheet.

* * * * *